United States Patent [19]

Bartley et al.

[11] Patent Number: 4,861,260

[45] Date of Patent: Aug. 29, 1989

[54] APPARATUS FOR FORMING A BLOWN PLASTIC CONTAINER

[75] Inventors: Harold D. Bartley, Springfield; William R. Gaiser, Dayton, both of Ohio

[73] Assignee: Broadway Companies, Inc., Dayton, Ohio

[21] Appl. No.: 157,449

[22] Filed: Feb. 19, 1988

[51] Int. Cl.⁴ .............................................. B29C 49/10
[52] U.S. Cl. ................................... 425/529; 215/1 C; 220/70; 264/532; 428/36.92; 428/542.8
[58] Field of Search ............... 425/522, 525, 529, 533; 264/531, 532, 537, 296; 215/1 C; 220/70; 428/35, 542.8, 36.92

[56] References Cited

U.S. PATENT DOCUMENTS

| | | | |
|---|---|---|---|
| 3,598,270 | 8/1971 | Adomaitis et al. | 220/70 X |
| 3,843,005 | 10/1974 | Uhlig | 215/1 C |
| 3,899,279 | 8/1975 | Hudson et al. | 264/532 X |
| 3,926,324 | 12/1975 | Zavasnik | 215/1 C |
| 3,933,246 | 1/1976 | Fulton | 220/70 X |
| 3,949,034 | 4/1976 | Uhlig | 264/296 X |
| 4,177,139 | 12/1979 | Gitnner et al. | 264/532 X |
| 4,382,769 | 5/1983 | Younkin et al. | 425/525 |
| 4,436,216 | 3/1984 | Chang | 215/1 C X |
| 4,438,856 | 3/1984 | Chang | 215/1 C X |
| 4,465,199 | 8/1984 | Aoki | 215/1 C |
| 4,518,558 | 5/1985 | Anway et al. | 425/525 X |
| 4,780,257 | 10/1988 | Beck | 264/537 X |

FOREIGN PATENT DOCUMENTS

1058566  7/1979  Canada .................. 220/70

Primary Examiner—Richard L. Chiesa
Attorney, Agent, or Firm—Biebel, French & Nauman

[57] ABSTRACT

Apparatus is disclosed for the forming of an annular depending skirt on the bottom of a container, such as a carbonated beverage bottle, which includes a plurality of articulated fingers extending into the mold cavity having distal ends which are proportioned to be received within a preform skirt portion prior to the blowing of the preform. The fingers are operated by engagement of cam surfaces concurrently with the blowing of the preform into a mold cavity to cause a programmed expansion of the skirt portion into a final single thickness annular skirt on the finished container.

6 Claims, 7 Drawing Sheets

APPARATUS FOR FORMING A BLOWN PLASTIC CONTAINER

BACKGROUND OF THE INVENTION

This invention relates to self-standing blown plastic containers. It has particular relation to pressure resistant bottles such as used for carbonated beverages, or the like, formed of bi-axially molecularly oriented polyethylene terephthalate. However, the principles of the invention may be applied to non-pressure containers, such as for wine, water, or the like, and the principles further are not intended to be limited to bottles formed of polyethylene terephthalate (PET), although the use of such material is preferred.

Blown pressure vessels in the form of plastic bottles formed of PET material have come into general use as disposable containers for carbonated beverages. In order to obtain the desired bi-axial orientation and to provide the preferred shape as a pressure vessel, such bottles have commonly been made with rounded or semispherical bottoms. In order to support such bottles in an upright position for filing, shelving and the like, auxiliary base cups, usually formed of polyethylene or polypropylene, assembled on the bottle after blowing, have come into widespread usage, as shown for example in U.S. Pat. Nos. of Chang, Nos. 4,436,216 issued March 13, 1984 and 4,438,856 issued March 27, 1984.

The industry has recognized the desirability of eliminating such base cups due, to the additional expense and inconvenience involved. The additional expense includes not only the cost of the cups themselves, but the cost and maintenance of the attendant separate lines of equipment to produce and handle the cups, and to assemble and glue or weld the same over the bottoms of the bottles. The recycling of such bottles also presents special problems due to the necessity for removing the base cups to separate the material of the base cups from the material of the bottles themselves.

Various attempts have been made to produce bottles formed of bi-axially oriented plastic material, such as PET, which are free standing on the bottom, using only plastic material which is integral with the bottle itself. Thus, carbonated beverage bottles have been proposed with "champaign" bottoms such as in the U.S. Pat. Nos. of Aoki, 4,465,199 issued August 14, 1984 and Gittner et al, 4,177,239 issued December 4, 1979, in which the bottom end wall is formed with an inwardly convex surface. The pressure within the bottle tends to cause the bottom to reverse or bulge out, and this must be resisted by adding material to the inwardly directed convex curve or fold forming the champaign bottom. Further, it is difficult, if not impossible, to achieve the desired bi-axial orientation in the bottom material itself, for optimum strength and stress crack resistance.

Carbonated beverage bottles are also being made with a bottom in which pentaloid leg portions are formed in the bottom wall, which partially project outwardly, to form support or locating feet, as shown in U.S. Pat. No. 3,598,270 and U.S. Pat. No. 4,518,558 issued May 21, 1985 to Anway et al. While carbonated beverage bottles having such pentaloid legs have been successful, they are subject to stress cracking, and further do not provide an annularly uniform support as to permit the bottle always to stand upright on a wire shelf.

Annularly continuous integral base supports have been suggested in the U.S. Pat. Nos. of Uhlig, 3,843,005 and 3,949,034. These supports are in the form of double-walled depending skirts which are pinched off, in the blow-molding process, from the material making up the bottom wall of the parison or preform, and are pressure molded into a skirt of ring shape during the blowing step. While such concept provides a useful and continuous support from a mechanical point of view, it severely reduces the pressure strength of the container as a pressure vessel and impairs the integrity of the vessel. This is particularly true when PET material is used, since it does not weld readily to itself, and a low or weak molecular bond is formed between the adjacent layers making up the skirt. Accordingly, the strength of the bottom is dependent primarily upon the mechanical strength of the fold, rather than the substantially higher tensile strength of the material forming the bi-axially oriented container wall.

There is accordingly needed a carbonated beverage bottle or container with a pressure bottom and with an integral depending annular skirt which does not impair the strength of the vessel, as a pressure vessel, and which will support the container in a stable upright position.

SUMMARY OF THE INVENTION

This invention relates to blow-molded, self-standing bottles or containers formed of plastic material, to the preforms for making such bottles, and to the methods and apparatus employed in the manufacture of such bottle. The invention has particular utility in the field of blow-molded pressure containers for carbonated beverages.

The pressure bottle for carbonated beverages and the like is disclosed which includes a pressure bottom, in which the bottom is formed with an integral single thickness annular depending support skirt. The bottle is blown from a preform which is similarly formed with an annular skirt portion formed about a closed bottom. During the blowing of the preform into the shape of the bottle, in the bottle mold, an annular array of fingers with distal ends engage the skirt portion of the preform and stretch it radially of the geometric center of the preform concurrently with the preform movement, under the influence of the blowing force, into the mating bottom surface of the mold. This stretching and guiding movement as provided by the finger operated mechanism occurs concurrently with and by reason of, the blowing force exerted on the preform in the mold, so that an annular single thickness skirt is formed on the resulting bottle simultaneously with the blowing of the bottle.

The invention provides a container with a pressure bottom in which the integrity of the bottom and the bi-axial orientation of the material are achieved without substantial disruption of the curved bottom portion of the preform into the final bottom shape, apart from the natural stretching which occurs during the blowing operation. The depending annular skirt portion of the preform, which provides the material ultimately making up the integral, single thickness support skirt for the bottle, is engaged or contacted at arcuately spaced locations on an internal or inside surface by the distal ends of fingers of the guiding and stretching mechanism, and is caused to be expanded symmetrically about the center axis of the container concurrently with the blowing of the container. Thereafter, the fingers are retracted from the inside surface of the completed skirt to permit the removal of the finished container.

The radial outward movement of the array of fingers is programmed by cams to coincide with the blowing and expanding of volume of the parison, such that an annular skirt of predetermined dimension is formed in the finished article. The axial length of the skirt exceeds the maximum depth of the bottom wall of the bottle within the confines of the skirt, so that the lower circular edge of the skirt terminates in a generally common support plane and provides a stable upright support for the completed bottle.

It is accordingly an important object of this invention to provide a container or bottle, as outlined above, formed of plastic material, having a pressure bottom incorporating an annular single thickness depending skirt which is formed as an integral part of the material of the container and which has a length in an axial direction with respect to the axis of the bottle, which length exceeds the depth of the bottom within the skirt, to form a stable support platform for holding the bottle or container in an upright position.

Another object of this invention is the provision of a preform for the blow molding of a bottle having a pressure bottom in which the preform has a generally tubular or annular skirt portion surrounding a closed and generally rounded bottom portion, in which the skirt portion of the preform is adapted to form an annular support skirt or platform on the finished container for supporting the container in an upright position.

Another object of the invention is the provision of method and apparatus for making a self-standing container, such as for carbonated beverages, as outlined above, including the simultaneous forming of a single thickness integral depending skirt during the blowing of the preform in a bottle mold.

A further object of the invention is the provision of apparatus for making a container, as outlined above, including a plurality of axially and radially movable fingers which have distal ends proportioned to engage a depending skirt portion of a preform. The fingers are programmed to stretch the skirt portion radially simultaneously with the blowing of the preform into the shape of the container within the mold.

A still further object of the invention is the provision of a stretch or forming mechanism and method, in which distal ends of an annular array of fingers are configured to engage an annular skirt portion of a preform, in the interior of a blow mold. The fingers are programmed, by cams, to spread radially apart from each other while engaged with the preform skirt portion, and the mechanism is operated by physical engagement of the preform with the mechanism, during the blowing of the preform in the mold, to form a self-supporting skirt in surrounding relation to the bottom of the container.

These and other objects and advantages of the invention will be apparent from the following description, the accompanying drawings, and the appended claims.

DESCRIPTION OF PREFERRED EMBODIMENTS

Figures 1, 2:
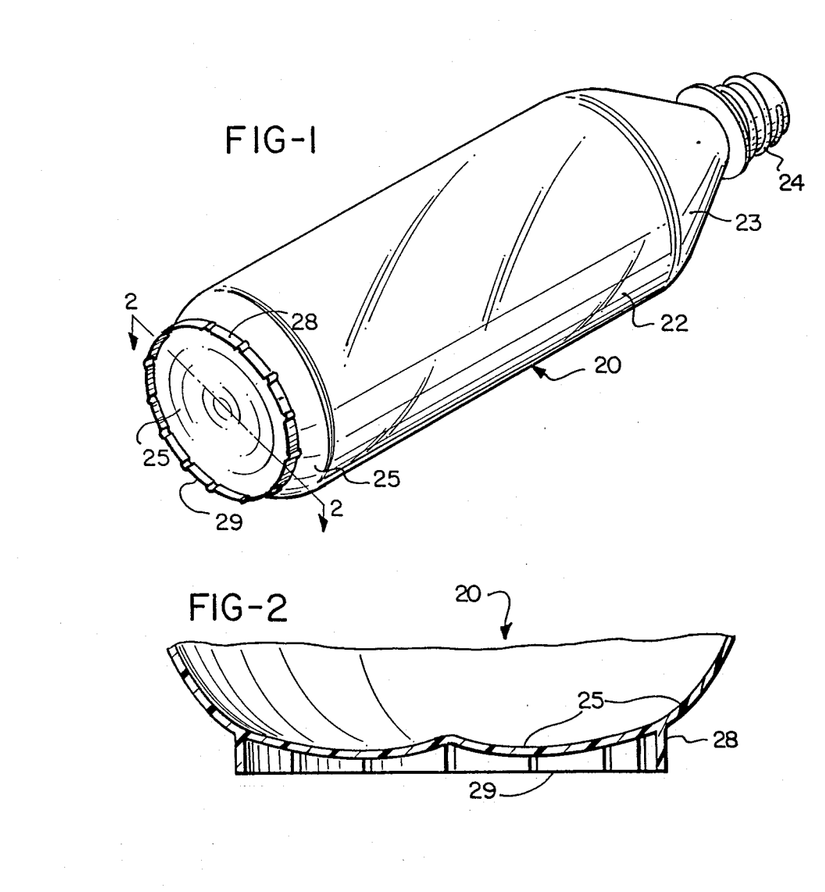
FIG. 1 is a perspective view of a bottle made in accordance with this invention.
FIG. 2 is an enlarged fragmentary sectional view of the pressure bottom of the bottle, taken generally along the line 2—2 of FIG. 1.

Referring to the figures of the drawings, which illustrate preferred embodiments of the invention, a blown plastic pressure container or bottle in accordance with this invention is illustrated generally at 20 in FIG. 1. The bottle 20 may be conventionally formed of polyethylene terephthalate (PET) for containing carbonated beverages. The bottle is formed with a generally cylindrical wall portion 22, a neck 23, and an upper threaded end 24 adapted to receive a screw cap, as conventional. The bottle 20 is also formed with a generally semispherical curved pressure bottom 25. The bottom 25 of the bottle is formed, inwardly of its outermost diameter, with a depending integral, annular, single thickness skirt 28. The skirt 28 terminates in a generally flat or planar bottom 29 and has a length, in the axial direction of the bottle, which exceeds the maximum depth of the curved bottom 25 within the annular dimensions of the skirt 28. The skirt 28 provides the means by which the bottle is supported in a free-standing upright position.

Figure 3:
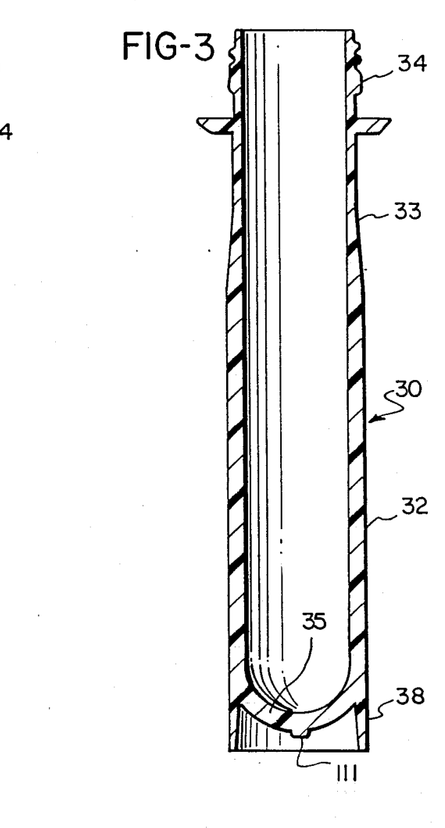
FIG. 3 is an enlarged sectional view through the preform of this invention and employed in the making of the bottle of FIG. 1.

The preform 30 from which the bottle 20 is formed, is illustrated in sectional view in FIG. 3, in which like parts are marked with like reference numbers plus 10. The preform may be formed by any conventional means, such as by injection molding, and is formed with a depending skirt portion 38, which will become the skirt 28 of the bottle 20, extending generally axially below a closed bottom portion 35. The preform 30 is conventional except for the integral single thickness cylindrical skirt portion 38 extending below and axially outwardly of the curved bottom 35, from which the bottle skirt 28 is formed.

The stretching or expanding mechanism employed by this invention to perform the method of this invention and to expand the skirt 28 to the position shown in FIG. 2, from the skirt portion 38 of the preform 30, is illustrated generally at 40 in FIGS. 4 through 12. For the purpose of establishing the identity of the various parts, reference may be had to the sectional view of FIG. 8 which shows the mechanism 40 in its start or initial position at the beginning of the blow molding cycle. The expanding mechanism 40 is shown as being received within the open bottom end of a mold 41, which has a mold cavity 41a (FIG. 4) therein, and the mechanism 40 in effect forms a closure to the bottom open end of the mold, and is provided with parts which configure and define the shape of the bottom 25 of the bottle 20.

Figure 4:
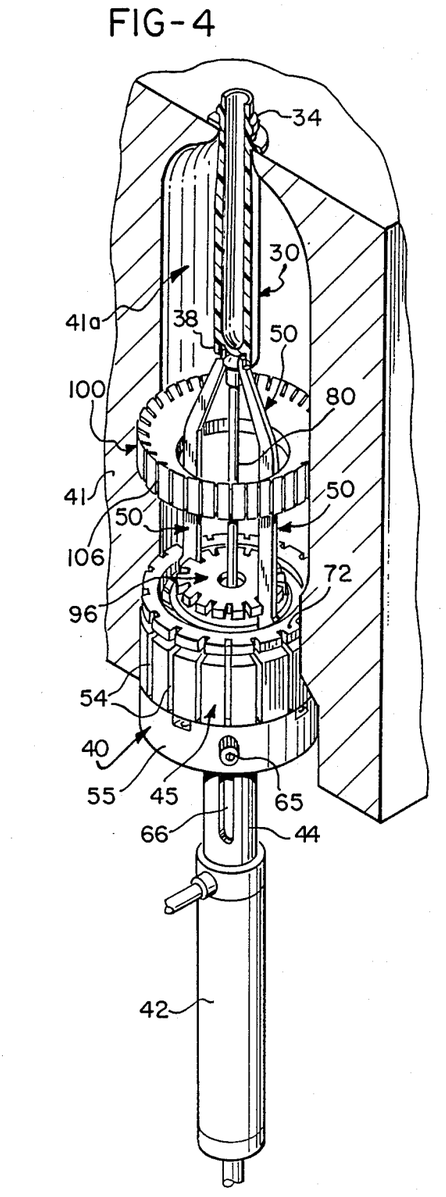
FIG. 4 is a perspective view, with parts broken away, showing the mold mechanism of this invention with the preform of FIG. 3 inserted within a mold cavity.

The mechanism 40 is mounted on an air cylinder 42, which extends outwardly of the mold cavity, on a generally upwardly extending slotted mounting sleeve 44. The upper end of the sleeve 44 supports a cylindrical body 45 of aluminum material or the like. The outer cylindrical surface of the body 45 is received in the open end of the mold cavity 41a and in effect forms a closure for the mold cavity, as shown in FIG. 4.

A hollow threaded nut 46 is received in the bottom of the body 45 and carries a cross pin 47. The ends of the pin are engaged in suitable tapped openings formed in the upper end of the sleeve 44. By this means the body 45, the sleeve 44, and the air cylinder 42 are assembled as a relatively rigid unit.

Figure 8:
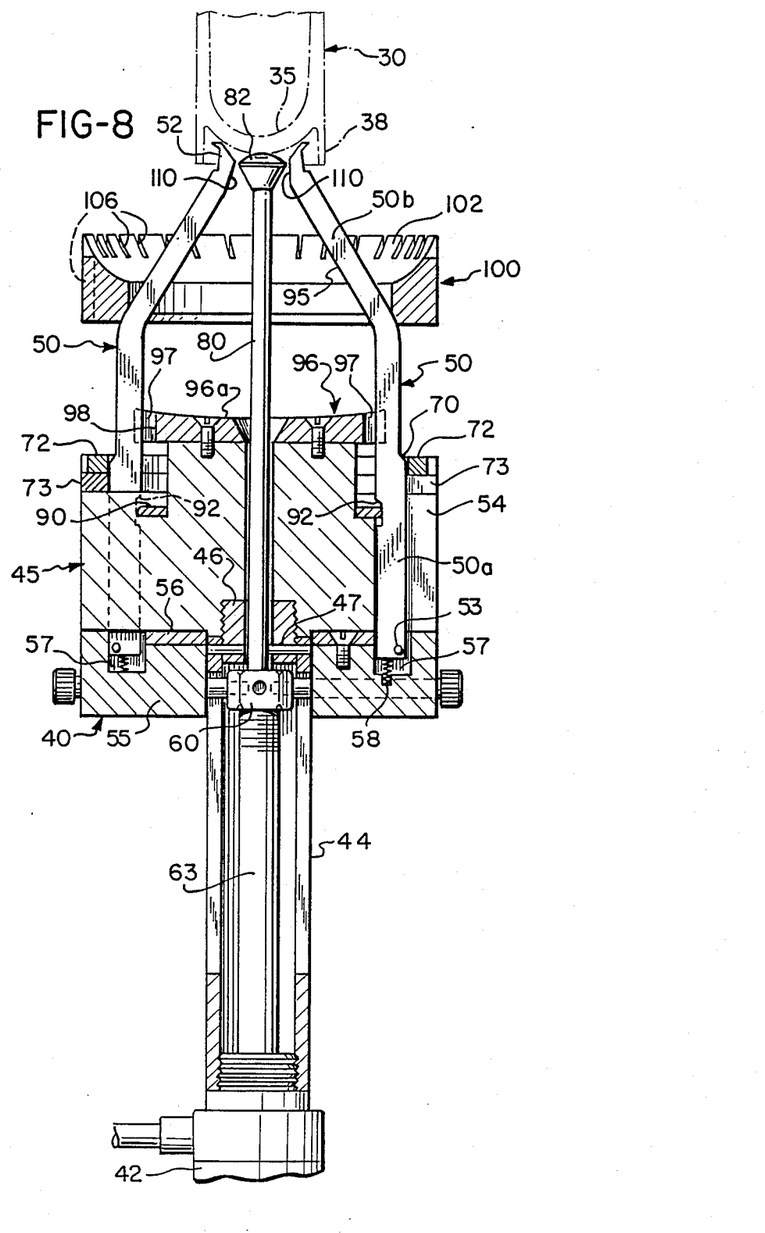
FIG. 8 is a transverse section through the skirt forming mechanism of this invention showing the position of the parts at the entry of the fingers into the skirt portion of the preform, as illustrated in FIG. 4.
Figure 9:
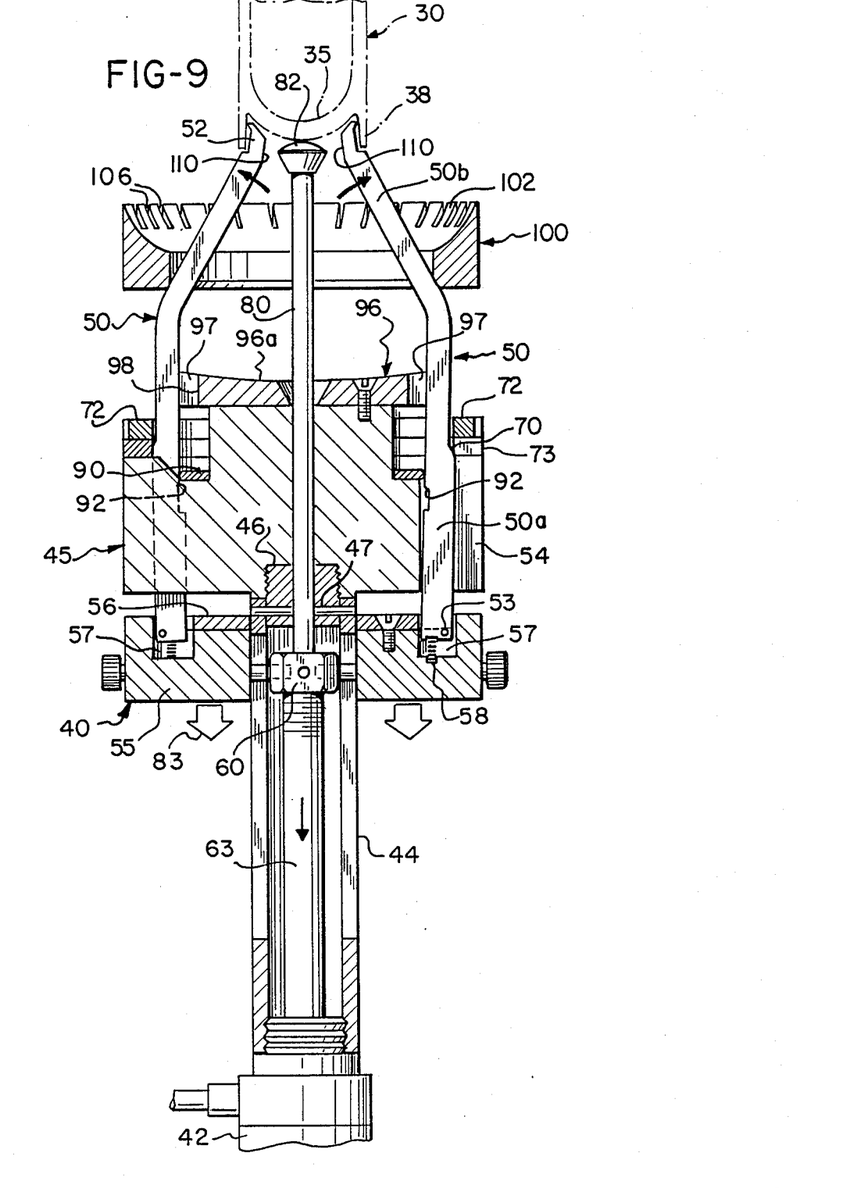
FIG. 9 is a view similar to FIG. 8 showing the moved position of the fingers into gripping engagement with the depending skirt portion of the preform.

The means for mechanically engaging the skirt portion 38 of the preform 30 and for causing the same to assume the position of the skirt 28 of the bottle 20, concurrently with bottle blowing, comprises a plurality of identical elongated upstanding articulated fingers 50. The fingers have outwardly turned distal ends 52 (FIG. 8) which are proportioned to be received as an annular array within the confines of the skirt portion 38, and are programmed to move radially outwardly into engagement with the skirt portion, as shown in FIG. 9, during the initial stages of the blowing operation.

Figures 11, 12:
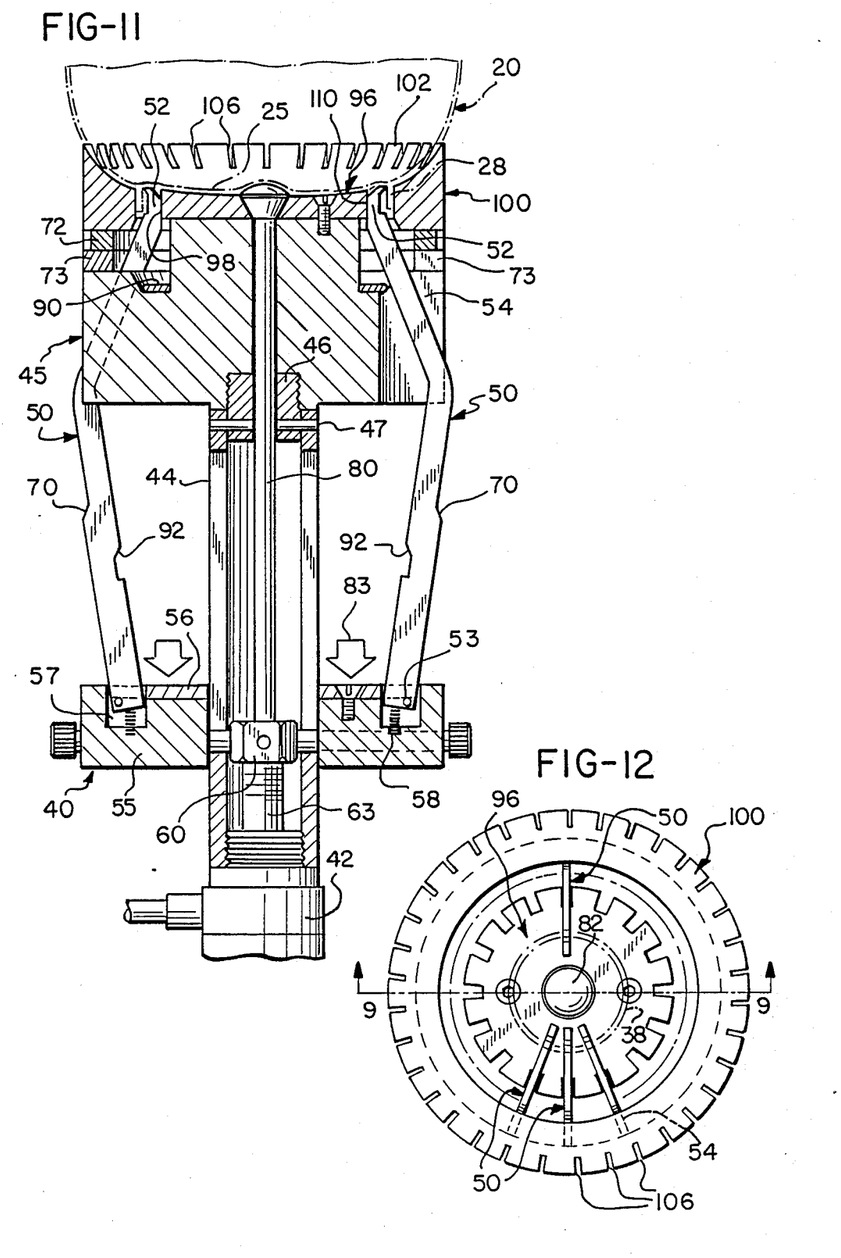
FIG. 11 is a view similar to FIG. 8 and showing the position of the parts generally corresponding to the view thereof in FIG. 7.
FIG. 12 is a plan view looking into the mechanism in which the fingers are in the position as illustrated in FIG. 9.

The fingers 52 have lower ends which are pivotally mounted on mounting pins 53 in an annular finger support plate 55. The plate 55 is received exteriorly of the mold cavity with the fingers mounted thereon extending into the interior of the mold, through corresponding radially extending slots 54 formed in the outer vertical walls of the body 45. The support plate 55, as best shown in FIG. 9, is provided with a central opening which is slidably received on the sleeve 44 for movement between an upper position, as shown in FIG. 8, in which the fingers are guided into and received within the confines of the skirt portion 38, and a lower position as shown in FIG. 11, in which the fingers are caused to be spread apart to carry the skirt portion to the final position concurrently with the pressure molding of the bottom 25.

An annular, flat slotted keeper plate 56 is mounted on the upper surface of the finger support plate 55 and retains the lower ends of the fingers, and the cross pins 53, within an upwardly opening groove 57 formed in the upper surface of the finger support plate 55. Compression springs 58 are inserted between the bottom of the groove 57 and the bottom of the respective fingers 50, to cause the fingers to be urged or biased rotationally outwardly, about the pins 53.

The individual fingers are provided with a first generally straight section 50a through the slots 54 and a second inwardly sloping section 50b. These sections are provided with operative cam-engaging surfaces on their respective inner and outer edges so that the concurrent movement of the fingers may be programmed to provide the desired result.

The finger support plate 55 is connected to the air cylinder 42 by means of a cross head 60. The cross head 60 may conveniently take the form of a nut threaded on the end of the actuating rod 63 of the air cylinder 42, and tapped to receive the threaded ends of a plurality of elongated retainer bolts 65. The inner ends of the bolts 65 are tapped to enter the crosshead 60, and pass through axially elongated slots 66 formed in the side wall of the sleeve 44 and through the plate 55. The slots 66 are the same length, and define, by their length, the extent of movement of the finger support plate 55 on the sleeve 44.

Figure 5:
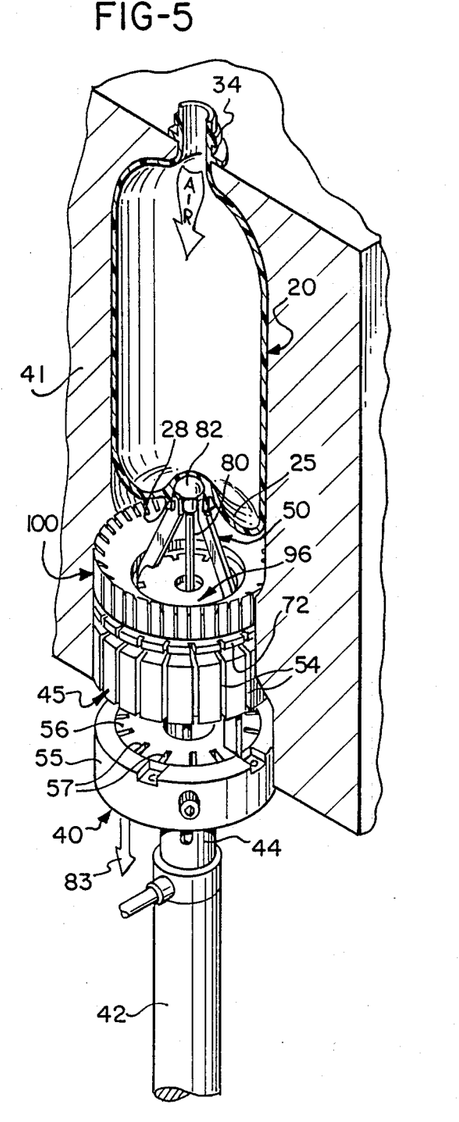
FIG. 5 is a view similar to FIG. 2 showing the partially formed bottle during the blow-molding operation.

The fingers 50 are programmed to provide for the controlled stretching of the skirt portion 38 concurrently with the formation of the bottom 25 of the blown bottle in the mold cavity. As shown, for example, in FIG. 5, the preform is substantially blown into the configuration of the mold walls prior to the formation of the bottom 25 of the container 20. This is accompanied by a substantial axial lengthening of the preform in the mold cavity during the initial blowing stages, as illustrated in FIG. 5. The fingers 50 are programmed, by the expanding mechanism 40, to begin the initial radial widening or spreading substantially at the position of the blowing operation shown in FIG. 5, with completion thereof concurrently with the completion of the bottom of the bottle. This movement is accomplished by cams which operate against cam surfaces formed on the inner and outer edges of the individual fingers.

First, it is desirable to retract the fingers so that the ends 52 reside about a circle which has a diameter somewhat less than the inside diameter of the skirt 38, to provide for ease of insertion of the gripping ends 52 within the skirt portion, as shown in FIG. 8. This movement inwardly of the fingers, against the compression springs 58, is accomplished by the interengagement of outside tapered cam surfaces 70 on the straight sections 50a of the arms with an encircling outside retaining ring 72. The ring 72 is mounted by spacer blocks 73 on the upper flat surface of the body 45 and is formed with an annularly smooth inside surface. The finger retaining ring defines the extent of spreading movement of the fingers within the slots 54 and retains the fingers within the slots in assembled relation. The relatively short sloping cam surfaces 70 are in engagement with the retaining ring 72 only in the position illustrated in FIGS. 4 and 8, in which the gripping ends 52 are inserted into the sleeve portion 38, and the plate 55 is in abutment with the bottom of the body 45.

During the blowing, the preform, under the influence of internal air pressure applied thereto, moves downwardly or axially of the mold cavity, and this movement is translated to the expanding mechanism 40. To assist in the translation of this movement to the mechanism including the finger support plate 55, the mechanism may be provided with a center pin 80 having a broadened head 82 proportioned to engage the curved bottom portion 35 of the preform 30, at the outer surface. The lower end of the pin 80 is threaded into the crosshead 60 and accordingly moves axially concurrently with the cross head and with the finger support plate 55. The enlarged head 82 transmits the force of movement of the preform, during blowing, to the plate 55 and effects the movement of this plate and the assembled fingers 50, in the direction indicated by the arrows 83 in FIGS. 9–11.

The initial movement of the preform causes the parts to assume the position as shown in FIG. 9 and the distal ends 52 of the fingers 50 will move outwardly into initial gripping and confined relation to the inside surface of the skirt portion 38. This initial outer gripping movement is assured by an inside annular cam 90 on the body 45. The inside cam engages an inside sloping surface 92 of each of the fingers 50, causing the fingers to pivot about the support pins 53 within their respective individual slots 54. The finger retaining plate 72 is provided with sufficient clearance with the finger sections 50a to assure the outward movement of the fingers as defined by the cam 90 and the inside tapered surface 92. Thereafter, throughout the extent of the straight sections 50a, the inside cam 90 will ride on the inside surfaces and will continue to define this position of the fingers.

Figure 6:
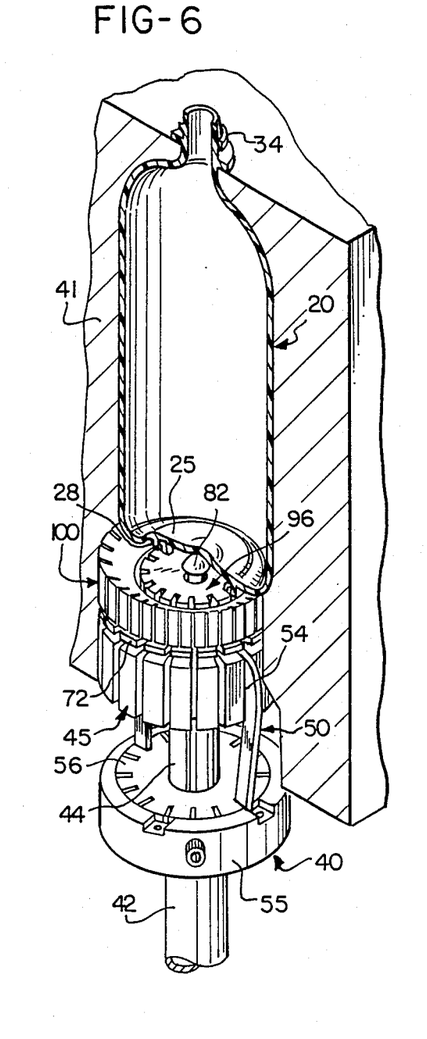
FIG. 6 is a view similar to FIG. 4 showing a further stage in the molding operation.
Figure 7:
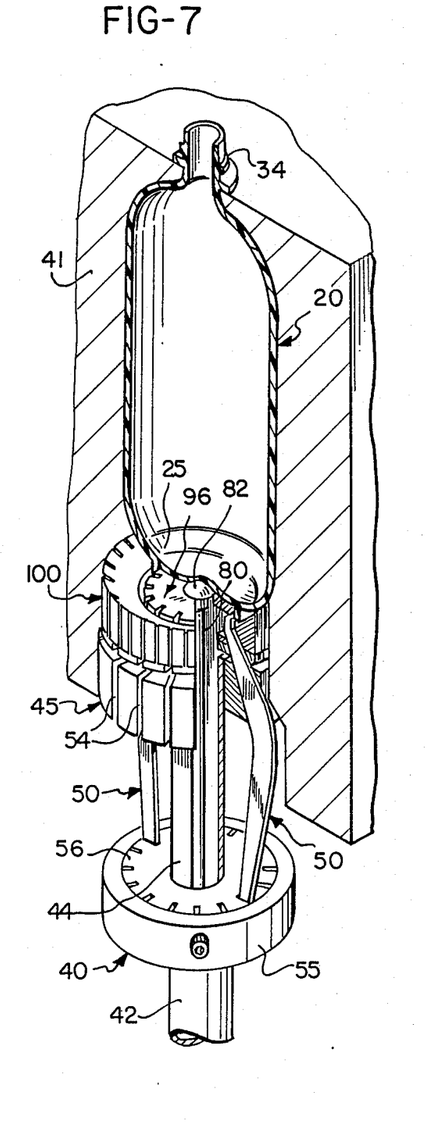
FIG. 7 is a view similar to FIG. 4 showing the molding operation at its completed or final stage.
Figure 10:
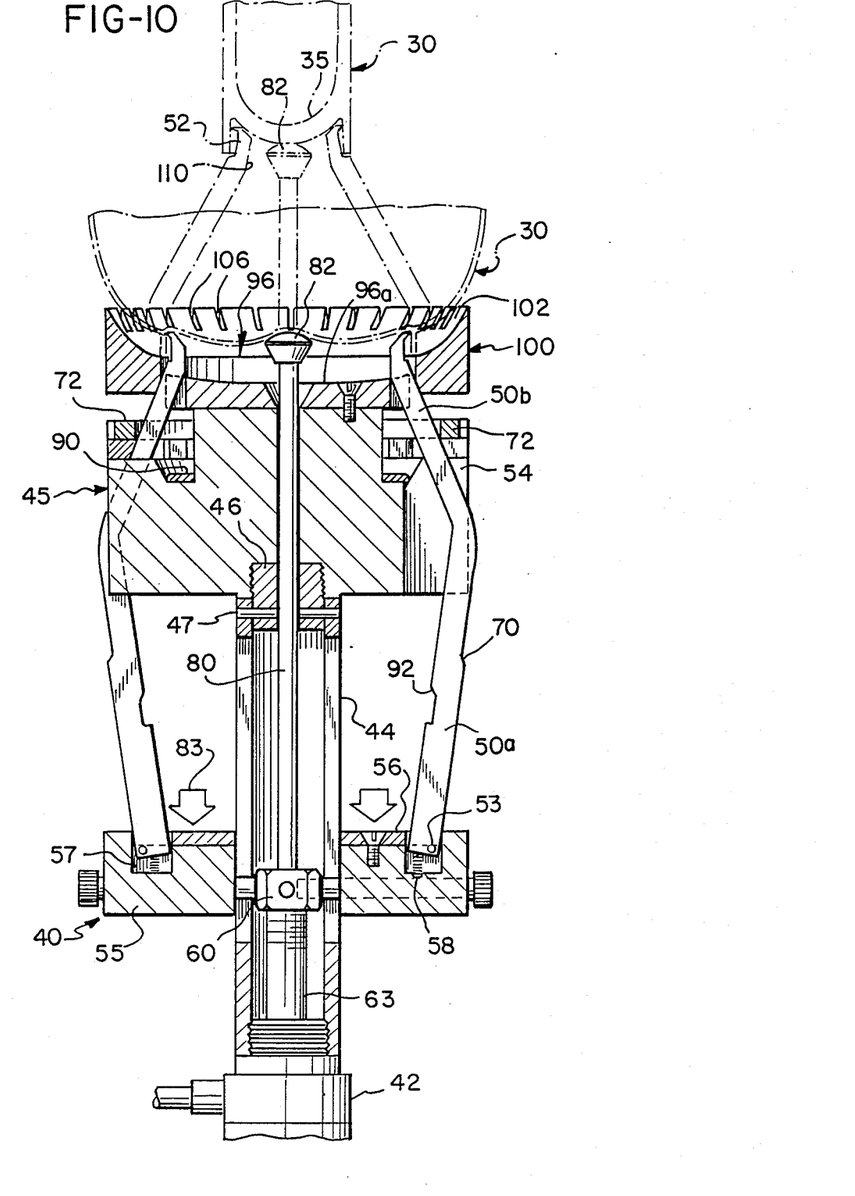
FIG. 10 is a view of the parts similar to FIG. 8 but showing the parts in a further moved position corresponding generally to the position shown in FIG. 6.

In order to illustrate the operation of the expanding mechanism 40 when approaching the end of the blow, the phantom views of the finger parts are illustrated in broken line in FIG. 10 in the relative position which the same parts occupy in FIG. 9. The full line position shows the movement of the fingers 50 radially outwardly to cause a concurrent circular expansion of the skirt portion 38 when the preform has been blown to approximately the position as illustrated in FIG. 6.

The second major programmed expanding movement of the fingers 50 is caused by the engagement of the inside sloping surfaces 95 of the finger sections 50b with a slotted cam or spreader plate 96 carried on the upper surface of the body 45. The spreader plate 96 has a somewhat concave upper surface 96a against which the bottom portion 35 of the preform will be moved in the final forming of the bottom of the bottle. The plate 96 is formed with a plurality of marginal slots 97, corresponding in number to the fingers 50, and in axial alignment with the body slots 54. The plate slots terminate at inside finger engaging surfaces 98. The surfaces 98 engage the sloping surfaces 95 of the fingers as the fingers, the pin 80, and the finger support plate 55 move downwardly within the mold during the blowing operation. This causes the fingers, and the associated skirt portion, to be expanded concurrently with the expansion of the container bottom between the phantom and full line positions as illustrated in FIG. 10, accompanied by the concurrent radially outward movement of the individual fingers 50.

It has been found desirable to incorporate an annular riding member, illustrated as a stabilizing ring 100. The ring 100 is formed with an upper molding surface 102 which forms a continuation of the upper surface 96a of the plate 96, and has the same outer diameter as the body 45. The stabilizing ring 100 has an inside diameter at 102 which permits the ring to ride on the outer sloping surfaces of the arms 50 at the tapered portions 50b thereof. As the fingers expand to their final position as shown in FIG. 10, the stabilizing ring 100 rides down in telescoping relation to the outer surface of the spreader plate 96, with the final position thereof illustrated in FIG. 11. The outer circumference of the stabilizing ring 100 is formed with a plurality of slots 106 to provide a path for the air otherwise trapped within the mold cavity, to escape past the ring during the final portion of the blowing operation when the bottom of the preform is coming into contact with the surfaces 97 and 102.

The final portion of movement, which may have an axial extent approximately equal to the corresponding axial length of the skirt 28, is preferably accomplished without further expansion, by the engagement of a straight inside section 110 of the fingers 50, at the gripping ends 52, with the cam surface 98 of the spreader plate 96. This engagement is illustrated as just beginning in FIG. 10 and as completed in FIG. 11. In this final movement, the bottom 25 is completed, with the skirt 28 nested between the cylindrical inside surface 102 of the stabilizing ring 100 and the finger ends 52.

The motive force for moving the finger assembly, including the finger support plate 55 and fingers 50, axially between its first and second positions, in the direction of the arrows 83, is the force imparted thereon by the preform itself as it is blown into the interior of the mold and bears down upon the enlarged head 82 of the pin 80. This force also causes the head 82 to tuck in the nipple 111 of plastic material on the outer surface of the bottom wall portion 35 left by the extrusion gate. The pin 80 and head 82 also serve the function of preventing over-bulging of the bottom during blowing.

The air cylinder 42 is double-ended and serves a primary purpose of providing an ejecting force of the bottle when the mold is opened and for returning the spreading mechanism to its first or start position as shown in FIG. 8. Also, the cylinder may provide a controlled air cushion, through suitable valving (not shown) during the blowing operation for assisting in controlling the rate of movement of the parison within the mold cavity.

The operation of the invention is largely self evident from the foregoing description and from the sequence of view of FIGS. 4-7 and FIGS. 8-11. A preform as illustrated in FIG. 3 is molded with the annular depending skirt portion 38, and the same is conventionally inserted into the neck of a mold cavity for blowing. The expanding mechanism 40 is moved to the elevated or start position substantially as shown in FIG. 4, with the stabilizing ring 100 in place resting on the shoulder or knee portion joining the straight sections 50a with the inwardly inclined sections 50b of the fingers. This is the position as illustrated in FIG. 4. The skirt-engaging ends 52 of the arms 50 are arranged substantially in a circular array and are received within the confines of the skirt portion 38 of the preform as shown in FIG. 8. This position is defined by the engagement of the outside sloping surfaces 70 with the outside cam 72.

The initial blowing movement, bearing on the head 82 of the pin 80, will move the finger support plate 55 and associated cross head 60 downwardly, and in the direction of the arrow 83, releasing the engagement of the cam surfaces 70 with the first or outside cam 72 and simultaneously bringing the second or inside cam 90 into engagement with the inside finger surfaces 92. This movement causes the gripper ends 52 to move outwardly into firm contact with the depending skirt portion 38.

Continued blowing of the preform is accompanied by continued movement, in the direction of the arrows 83, of the finger assembly including the finger support plate 55 and the fingers 50, as shown in FIG. 10 with the engagement of the sloping inside finger surfaces 90 and the cam surfaces 98 of the spreader plate 96, while the final movement defines the final position of the pressure bottom 25, bringing the newly formed dependent skirt 28 into the annular opening formed in the stabilizing ring 100, to the position shown in FIG. 11. In this manner, a substantially circular, continuous, integral, single thickness supporting skirt is formed as shown in FIGS. 1 and 2 which has a lower planar edge 29, which extends in the axial direction of the bottle below the lowermost portion of the pressure bottom 25. This skirt provides a stable and firm pedestal for the completed bottle 20.

While the process, products and apparatus herein described constitute preferred embodiments of this invention, it is to be understood that the invention is not limited to these precise process, products and apparatus, and that changes may be made therein without departing from the scope of the invention which is defined in the appended claims.

What is claimed is:

1. In the blow molding of PET bottles from a PET preform in which the preform extends from a mold top partially into a bottle mold cavity of a bottle mold and in which the preform is formed with an open top and a closed bottom portion and with a depending skirt portion formed about said bottom portion, the improvement for forming a support on the bottle bottom comprising:

said bottle mold having said top and a closed bottom, means at said mold top for supporting said preform at said open top thereof with said preform extending into said mold interior, means in said closed mold bottom including a plurality of fingers extending into said mold interior, said fingers each having distal ends configured to engage said skirt portion in said mold, means operating concurrently with the blowing of said preform causing said finger ends to spread radially apart from each other while maintaining said annular array relationship and while so engaged with such preform skirt portion, and means causing said fingers to retreat toward said mold bottom concurrently with said last-named means and concurrently with the blowing of said bottle for causing such skirt portion to expand radially and move toward the closed mold bottom.

2. The improvement of claim 1 further comprising means associated with said fingers for contacting such preform and responsive to blowing movement of such preform in said mold for causing said finger retreat movement.

3. In the molding of pressure containers such as for carbonated beverages from a plastic preform in which the preform extends from a mold top partially into a mold cavity, the improvement comprising:

a blow mold having a top, a closed bottom, and having a hollow interior cavity, means in said bottom including a plurality of individual fingers extending into said mold cavity, common means in said mold cavity extending through said mold bottom supporting said fingers in an annular array for concurrent relatively outward radial movement and axial movement through said mold bottom with respect to said cavity, means on each of said fingers defining distal ends, said ends configured to engage an annular skirt portion on a preform in said mold in which said skirt finger surrounds a bottom of said preform, said distal ends arranged with respect to each other as an annular array, said common means having cam means in said mold cavity engageable by said fingers upon relative movement of said fingers and cavity, causing said finger distal ends to spread radially apart relative to each other while maintaining said annular relationship and while engaged with a preform skirt portion, means responsive to the movement of said preform in said mold cavity during blowing thereof for causing said common means and said fingers to retreat toward said closed mold bottom concurrently with the engagement of said fingers and said cam means, said common means having a portion within said fingers engageable by a preform at substantially the fully blown position thereof for defining the shape of the bottom of the blown container.

4. Apparatus for the formation on a blow-molded container of a skirt on the container bottom to provide for the free standing of the container in an upright position, said container being blown in a mold cavity from a preform having an annular skirt portion at an end thereof remote from the container top and surrounding an end of the preform, comprising a mold having a mold cavity, a closed bottom a plurality of articulated fingers in said mold cavity arranged in an annular array, said fingers terminated in distal ends proportioned to be received within said preform skirt portion prior to blowing of said preform, means supporting said fingers for axial and radial movement with respect to said mold cavity, means responsive to movement of said preform in said mold cavity during blowing thereof for causing programmed radial movement of said fingers in unison concurrently with axial movement thereof, to stretch said skirt portion into an annular support skirt on the container bottom.

5. The apparatus of claim 4 in which said finger movement means includes a plurality of cams positioned in said mold cavity to engage said fingers, said cams including a first cam for retracting said fingers into the confines of said preform skirt portion, a second cam for expanding said fingers into engagement with said skirt portion, and a third cam for expanding said fingers concurrently with said axial movement thereof.

6. Molding apparatus for the development of an annular skirt on the bottom of a blow-molded bottle from an annular skirt portion on a preform for said bottle, comprising:

a bottle mold having a hollow mold cavity therein, having a top through which the preform is blown, and having a closed bottom, means associated with said mold bottom including an annular finger support, means mounting said fingers on said support in an annular array providing for relatively outward pivotal movement of said fingers on said support, said support being movable from a first position in which said fingers extend from said closed mold bottom within said mold cavity to a second position in which said fingers are retracted into said closed mold bottom, each of said fingers being provided with a distal end proportioned to engage a skirt of a preform at an inner portion of said skirt portion, and cam means engageable by said fingers for causing said fingers to move pivotally radially of each other on said support concurrently with the blowing of such preform in said cavity.

* * * * *